United States Patent [19]

Meguiar

[11] Patent Number: 5,300,141
[45] Date of Patent: Apr. 5, 1994

[54] ANTI-STATIC COMPOSITIONS FOR MOLDS, MOLDED PARTS AND PAINTED SURFACES

[76] Inventor: Floyd Meguiar, 376 Palm Dr., Arcadia, Calif. 91007

[21] Appl. No.: 881,418

[22] Filed: May 11, 1992

[51] Int. Cl.$^5$ ................................. C09G 1/08
[52] U.S. Cl. ..................... 106/10; 106/38.25; 106/271
[58] Field of Search .............. 106/10, 38.25, 271

[56] References Cited

U.S. PATENT DOCUMENTS

| | | | |
|---|---|---|---|
| 3,424,599 | 1/1969 | Kaupp et al. | 106/10 |
| 4,055,433 | 10/1977 | Morones | 106/10 |
| 4,163,673 | 8/1979 | Dechert | 106/10 |
| 4,343,863 | 8/1982 | Lawrence et al. | 106/10 |
| 4,750,933 | 6/1988 | Brandstetter et al. | 106/10 |
| 5,028,265 | 7/1991 | Schmidt-Theummes et al. | 106/10 |

*Primary Examiner*—Helene Klemanski
*Attorney, Agent, or Firm*—Louis J. Bachand

[57] ABSTRACT

Wax-based composition for protecting and polishing paint, plastic and metal surfaces, or as a mold release, to remain free of clinging dust, comprising a first hydrocarbon wax having a relatively higher HLB value, a second hydrocarbon wax having a relatively lower HLB value, the first and second waxes being combined into a wax blend having an intermediate HLB value based on the proportions of each wax, a solvent for the blend, the solvent having a given HLB value, the HLB value of the wax-solvent mixture being predetermined by the wax blend HLB value and the concentration and HLB value of the solvent, and a small but effective amount of a quaternary compound having an anti-static persistence at the predetermined HLB value to maintain the surfaces protected, polished and free of clinging dust.

31 Claims, No Drawings

ANTI-STATIC COMPOSITIONS FOR MOLDS, MOLDED PARTS AND PAINTED SURFACES

TECHNICAL FIELD

This invention relates to anti-static compositions for plastic parts molds, for molded parts and for painted surfaces, especially automotive painted surfaces. More particularly, the invention is concerned with modifications of wax, sealer and mold release compositions to permit effective incorporation of anti-static agents, while retaining their protectiveness, durability, polishability and gloss.

BACKGROUND

Wax and sealer compositions find wide use in protecting and polishing metal, painted and plastic surfaces, and as release agents in molding and lay-up operations. Natural and synthetic waxes are blended with solvent systems and applied to the surface to be protected. Often the applied wax is buffed to a high gloss. Also the surface to which a wax release agent is applied may have been preliminarily buffed before waxing or sealing to ensure the smoothest possible surface.

Buffing and polishing engender in the wax or sealer a static charge which attracts dust and other airborne particles to the surface adversely affecting appearance, and, in the case of mold release agents, bringing potential surface defects into the mold.

SUMMARY OF THE INVENTION

The use of various anti-static agents in waxes (which term, unless otherwise indicated, is used herein to included waxes per se, sealers, and mold release agents based on waxes), is broadly known. Prior workers, however, have failed to recognize the criticality of tailoring the wax composition to create the optimum environment for the anti-static agent with the result that anti-static effects are not realized despite the inclusion of anti-static agents in the formulation.

It is an object therefore of the present invention to provide improved wax compositions which are persistently anti-static when applied onto a painted, plastic or metal surfaces as protective polishes or as a mold release. It is another object to provide such compositions in which the solvent component and the wax component are blended in selected ratios proportioned with reference to their HLB (Hydrophilic-Lipophilic Balance) numbers so as to achieve an HLB factor in the blend which is highly suited to the persistence of the anti-static agent. It is another object to provide surface waxes, polishes, sealing agents and mold release compositions in which a blend of waxes having as a blend a predetermined HLB number is combined with solvent having an HLB number selected with reference to the HLB number of the wax blend to bring the HLB number of the solvent wax blend mixture to a value compatible with persistence of the anti-static agent in the mixture.

These objects and other objects to become apparent hereinafter are realized in accordance with the invention in a wax-based composition for protecting and polishing paint, plastic and metal surfaces to remain free of clinging dust, comprising a first hydrocarbon wax having a relatively higher HLB value, a second hydrocarbon wax having a relatively lower HLB value, the first and second waxes being combined into a wax blend having an intermediate HLB value based on the proportions of each wax, a solvent for the blend, the solvent having a given HLB value, the combined HLB value of the wax-solvent mixture being predetermined by the wax blend HLB value and the concentration and HLB value of the solvent, and a small but effective amount of a quaternary compound having an anti-static persistence at the predetermined HLB value to maintain the surfaces protected, polished and free of clinging dust.

In particular compositions, the quaternary compound is a quaternary amine, such as a quaternary ammonium compound, e.g. a quaternary ammonium chloride, or other halide or salt.

In particular compositions, the quaternary compound is present in an amount from 2 to 25% based on the total weight of the composition, and preferably from 5 to 10% based on the total weight of the composition.

In particular compositions, the solvent is an aromatic solvent, such as a naphthenic solvent comprising a major weight proportion of naphtha.

In particular embodiments, too, the solvent has an HLB value above 12 and is present in an amount between 35 and 65 parts by weight based on the weight of the blended waxes and solvent in the composition, and preferably between about 45 and about 55 parts by weight based on the weight of the blended waxes and solvent in the composition.

In particularly preferred embodiments, the relatively higher HLB value wax has an HLB value of about 15 and is present in an amount sufficient to give the wax blend an HLB value of about 12, where the relatively lower HLB value wax has an HLB value of about 8; the solvent is a naphthenic solvent having an HLB value of about 17 and is present in an amount sufficient to give the composition an HLB value of about 15; the waxes are polyethylene waxes; and, the composition comprises from 10 to 35% by weight solids, based on the total weight of the composition.

The foregoing composition, in a suitable vehicle, is useful as a mold release. Thus the invention contemplates the foregoing composition and an organic liquid vehicle for delivery thereof onto a mold surface, e.g. an organic liquid vehicle comprising a blend of isopropanol and ethanol in weight proportions from 2:1 to 1:2, or other relatively volatile organic liquid in which the composition may be dispersed, distributed or dissolved.

DETAILED DESCRIPTION

While the invention is best described with reference to the following examples, it may be noted that the invention involves the careful selection and combining of HLB values of the waxes and the solvents, with reference to the particular quaternary compound to be added, so as to provide the most hospitable environment for the quaternary compound. Unlike the prior art where initial anti-static performance was the criterion and differentiation of composition components on the basis of HLB values was not practiced, in the present invention persistence of the anti-static function over time is sought and obtained through the control of HLB values to optimize the environment for the anti-static agent. It has been found that the invention compositions are not dust repellant, or so charged that dust does not accumulate, but rather, the surface, be it a plastic surface, a marine paint surface, a car finish or, in the mold release embodiments of the invention, the highly polished interior surface of a mold, is non-retentive to dust and dirt. There is no cling of dust or dirt to the surface, so that upon light brushing or even blowing the dust or dirt leaves the surface.

The waxes mentioned herein are typical and their specific composition is less important than their HLB values, assuming that the protective and polishing qualities sought are present. Similarly, the solvents used are not narrowly critical, provided the waxes are solvated sufficiently for incorporation of all ingredients and for effective application of the finished product. The quaternary compounds used are typical of anti-static agents and may be of various specific compositions, with those listed and exemplified being a preferred class.

The proportions and specific HLB values given are illustrative and may be varied provided there is an effective composition for the purpose intended and a consistency in the HLB values conducive to persistence in the anti-static effect of the anti-static agent.

EXAMPLES

In the following examples, all parts and percentages are by weight.

EXAMPLE 1

An automotive paste wax composition persistently free of binding attraction to dust in the applied condition was prepared at about 33% solids by blending a higher melting hydrocarbon wax, having an HLB of 15, and a lower melting hydrocarbon wax having an HLB of 8 in proportions of 60/40 to a combined HLB value of about 12. The wax blend was mixed under heat with a napthenic solvent for the blend waxes having a HLB value of 17 in a ratio of 45 parts wax blend and 55 parts solvent to provide an HLB value for the wax-solvent composition of about 15. After the wax and solvent were thoroughly mixed and heated to about 200 Degrees F., an anti-static agent comprising a quaternary amine (dicoco dimethyl ammonium chloride) was stirred into the mixture at a concentration of about 6%. Heating and stirring were continued for another 30 minutes at approximately 204 Degrees F. after which the final wax product was poured into containers.

The wax product was evaluated by applying to steel panels coated with automotive paint and rubbing until a high gloss was obtained. The panels were exposed in an open, unpaved area during daylight hours and periodically inspected for accumulation of dust. In all cases dust accumulated across the panels surfaces. Periodically, the dust was brushed off the panels with a soft, untreated brush; there was no remainder of dust on the panels, indicative of the panel surface having no electrostatic attractiveness for the dust. These results are noted for multiple day exposures until the test is discontinued.

In a control, the above formulation is repeated but with the use of 100% of the higher HLB value wax, so that the HLB value of the wax portion was 15, and that of the solvent 17. A decrease in the non-attraction of the panel surfaces for dust was noted after a second day of exposure, with the accumulated dust being increasingly difficult to remove by simple brushing. In a second control, this same lack of persistence in nonretention of dust is noted when 100% of the lower HLB value wax (HLB=8) is used in the example procedure.

It was concluded that the adjustment of the HLB value to one at which the quaternary amine could persist added greatly to the effectiveness of the composition as a wax and as a dust nonretentive.

EXAMPLE 2

Example 1 was duplicated with modifications to make a liquid wax containing about 12% solids. The wax-solvent mixture was heated to about 250 Degrees F., additional solvent was added, and the quaternary blended in with continued heating for an additional 30 minutes.

EXAMPLE 3

Example 2 is repeated substituting dihydroxyethylisodecyloxypropyl ammonium chloride as the quaternary compound. Results are equivalent.

EXAMPLE 4

Example 2 is repeated substituting amine oxide as the quaternary compound. Results are equivalent.

The foregoing objects are thus achieved,

I claim:

1. Wax-based composition for protecting and polishing paint, plastic and metal surfaces to remain free of clinging dust, comprising a first hydrocarbon wax having a relatively higher HLB value above about 15, a second hydrocarbon wax having a relatively lower HLB value of about 8, said first and second waxes being combined into a wax blend having an intermediate HLB value based on the proportions of each wax, a solvent for said blend having an HLB value above 12, said solvent and wax combination having a combined HLB value, and a small but anti-static-effective amount of a quaternary compound having an anti-static persistence at said combined HLB value to maintain said surfaces protected, polished and free of clinging dust.

2. Wax-based composition according to claim 1, in which said quaternary compound is a quaternary amine.

3. Wax-based composition according to claim 2, in which said quaternary compound is a quaternary ammonium compound.

4. Wax-based composition according to claim 3, in which said quaternary compound is a quaternary ammonium chloride.

5. Wax-based composition according to claim 1, in which said quaternary compound is present in an amount from 2 to 25% based on the total weight of said composition.

6. Wax-based composition according to claim 1, in which said quaternary compound is present in an amount from 5 to 10% based on the total weight of said composition.

7. Wax-based composition according to claim 1, in which said solvent is an aromatic solvent.

8. Wax-based composition according to claim 7, in which said aromatic solvent is a naphthenic solvent comprising a major weight proportion of naphtha.

9. Wax-based composition according to claim 8, in which said solvent is present in an amount between 35 and 65 parts by weight per 100 parts by weight of the blended waxes and solvent in said composition.

10. Wax-based composition according to claim 9, in which said solvent is present in an amount between about 45 and about 55 parts by weight per 100 parts by weight of the wax and solvent in said composition.

11. Wax-based composition according to claim 10, in which said relatively higher HLB value wax has an HLB value of about 15 and is present in an amount sufficient to give said wax blend an HLB value of about 12, where the relatively lower HLB value wax has an HLB value of about 8.

12. Wax-based composition according to claim 11, in which said solvent is a naphthenic solvent having an HLB value of about 17 and is present in an amount sufficient to give said composition an HLB value of about 15.

13. Wax-based composition according to claim 12, in which said waxes are polyethylene waxes.

14. Wax-based composition according to claim 13, in which said composition comprises from 10 to 35% by weight solids, based on the total weight of the composition.

15. Wax-based composition according to claim 1, in which said waxes are polyethylene waxes, and said composition comprises from 10 to 35% by weight solids.

16. Mold release agent comprising the composition of claim 1, and an organic liquid vehicle for delivery thereof onto a mold surface.

17. Mold release agent according to claim 16, in which said solvent comprises a blend of isopropanol and ethanol in weight proportions from 2:1 to 1:2.

18. Wax-based composition for protecting and polishing surfaces to remain free of clinging dust, comprising hydrocarbon wax and a solvent for said wax having an HLB value above about 12, said hydrocarbon wax and solvent having a combined HLB value, and a small but anti-static-effective amount of a quaternary compound having an anti-static persistence at said combined HLB value.

19. Wax-based composition according to claim 18, in which said quaternary compound is present in an amount from 2 to 25% based on the total weight of said composition.

20. Wax-based composition according to claim 18, in which said quaternary compound is present in an amount from 5 to 10% based on the total weight of said composition.

21. Wax-based composition according to claim 18, in which said solvent is an aromatic solvent.

22. Wax-based composition according to claim 21, in which said aromatic solvent is a naphthenic solvent comprising a major weight proportion of naphtha.

23. Wax-based composition according to claim 18, in which said solvent is present in an amount between 35 and 65 parts by weight per 100 parts by weight of the blended waxes and solvent in said composition.

24. Wax-based composition according to claim 18, in which said solvent is present in an amount between about 45 and about 55 parts by weight per 100 parts by weight of the wax and solvent in said composition.

25. Wax-based composition according to claim 18, in which said hydrocarbon wax comprises a first wax having an HLB value above about 15, and a second wax having an HLB value of about 8.

26. Wax-based composition according to claim 18, in which said solvent is a naphthenic solvent having an HLB value of about 17 and is present in an amount sufficient to give said composition an HLB value of about 15.

27. Wax-based composition according to claim 18, in which said waxes are polyethylene waxes.

28. Wax-based composition according to claim 18, in which said composition comprises from 10 to 35% by weight solids, based on the total weight of the composition.

29. Wax-based composition according to claim 18, in which said wax comprises two different HLB value polyethylene waxes, and said composition comprises from 10 to 35% by weight solids.

30. Mold release agent comprising the composition of claim 18, and an organic liquid vehicle for delivery thereof onto a mold surface.

31. Mold release agent according to claim 30, in which said solvent comprises a blend of isopropanol and ethanol in weight proportions from 2:1 to 1:2.

* * * * *